United States Patent [19]

Olmstead

[11] 4,113,301
[45] Sep. 12, 1978

[54] COMPACT TENT-TYPE CAMPING TRAILER
[75] Inventor: William Dean Olmstead, Costa Mesa, Calif.
[73] Assignee: Cycle-Kamp Inc., Anaheim, Calif.
[21] Appl. No.: 735,429
[22] Filed: Oct. 26, 1976
[51] Int. Cl.[2] .............................................. B60P 3/34
[52] U.S. Cl. .................................... 296/23 H; 52/66; 296/27
[58] Field of Search ..................... 296/23 H, 23 R, 27; 52/66; 135/3 A, 4 A

[56] References Cited
U.S. PATENT DOCUMENTS

| 3,194,251 | 7/1965 | Pettersen | 52/66 |
| 3,608,953 | 9/1971 | Bernard | 296/23 H |

FOREIGN PATENT DOCUMENTS 85,016  12/1954  Norway ................................. 296/23 H Primary Examiner—John A. Pekar

[57] ABSTRACT

A lightweight and compact tent-type camping trailer which is easy to set up and collapse and which is especially adapted for towing by motorcycles. The trailer comprises a wheel supported trailer bed and a top member. The top member covers the trailer bed when the trailer is in a towing condition and forms the top to a tent when the trailer is in a set-up condition. A pair of floor defining members for the tent are hinged along upper edges of opposite sides of the trailer bed to extend within the trailer bed when in the towing condition and to swing upwardly and outwardly to generally horizontal positions in the set-up condition for the trailer. Tent material is secured along marginal edges of the top member and along edges of the floor defining members opposite the hinged edges thereof. The width of the tent material as secured between the top member and the floor defining members is slightly greater than the width of the floor defining member whereby the tent material exerts a lifting force on the floor defining members as the top member is raised to automatically swing the floor defining members upwardly and then outwardly from the trailer bed to the set-up condition. Brace members are hinged at each corner of the trailer bed to swing upwardly from within the trailer bed to releasably lock the top member in the set-up condition.

4 Claims, 5 Drawing Figures

COMPACT TENT-TYPE CAMPING TRAILER

BACKGROUND OF INVENTION

Generally speaking it is desired that camping trailers for towing by motorcycles and small compact cars be of a light-weight and streamline construction. For such purposes small tent-type trailers have been designed having removable tops and enclosing tent structures which are assembled much like conventional camping tents on top of the trailer bed. As with most camping tents, such assembly is time consuming and requires the putting together and anchoring of vertical brace members and the attaching of tent material thereto to form the tent. Such tents are rather unstable particularly as mounted on top of the trailer bed.

The present invention overcomes the problems associated with prior compact tent-type trailers for towing by motorcycles and the like by providing a self-contained tent structure which is automatically assembled as the top of the trailer is manually raised to a set-up condition to define a solid top for the tent.

SUMMARY OF INVENTION

A compact tent-type trailer comprising a trailer bed having upstanding sides and ends. A top member covers the trailer bed when the trailer is in a towing condition and forms a solid top for a tent when the trailer is in a set-up condition. A pair of floor defining members for the tent are hinged along opposite sides of the trailer bed to extend within the trailer bed in the towing condition and to swing upwardly and outwardly beyond the sides of the trailer bed to generally horizontal positions in the set-up condition for the trailer. Tent material is secured along marginal edges of the top member and along an edge of each floor member opposite the hinged edge thereof to lay within the trailer and between the floor members and the top member in the towing condition and to automatically form right and left sides, front and back of the tent when the top member is raised and the floor defining members swing outwardly to define the set-up condition. Brace members at each corner of the trailer bed support and releasably lock the top member in the set-up condition.

DESCRIPTION OF PREFERRED EMBODIMENT

Figure 1:
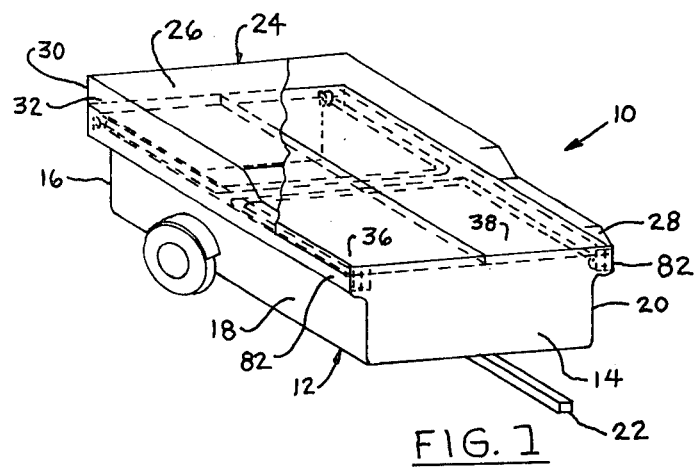
FIG. 1 is a perspective view of a preferred form of the trailer of the present invention having its top partially cut away to expose the interior of the trailer in a towing condition.

The illustrated form of the trailer of the present invention is represented by the number 10 and as shown in FIG. 1 includes a wheel supported trailer bed 12 covered by a matching top member 24 in a towing condition for the trailer. The trailer bed is generally rectangular in shape having upstanding ends 14 and 16 and sides 18 and 20. It is adapted for towing by a tow bar 22 when connected to a motorcycle or the like by a hitch (not shown). Likewise the top member 24 is of generally rectangular shape having a streamline top 26, ends 28 and 30 and sides 32 and 34. In the towing condition of FIG. 1, the top member is releasably secured to the trailer bed as by clamps (not shown).

Figure 2:
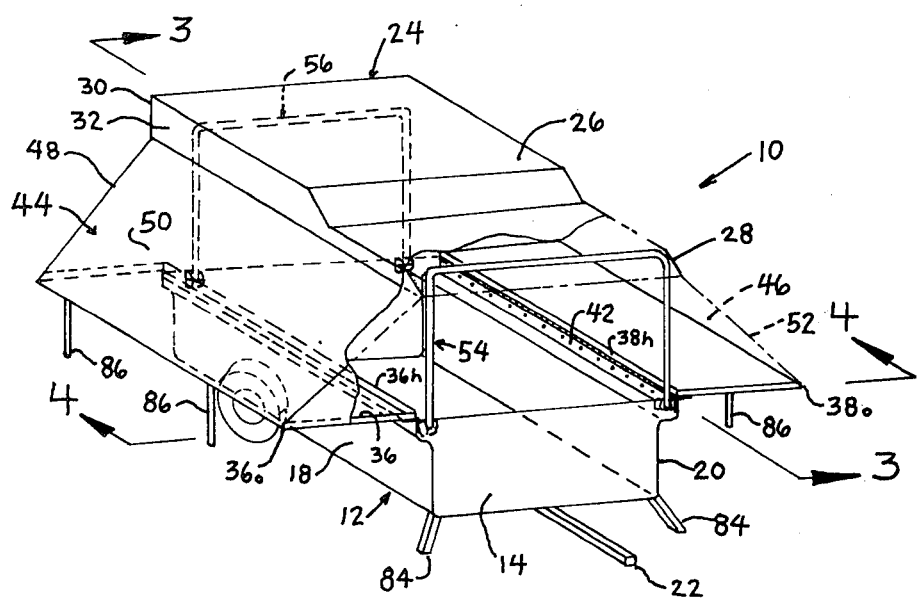
FIG. 2 is a perspective view of the trailer in a set-up condition with a portion of the top and front thereof removed to expose the inner construction of the trailer.
Figure 4:
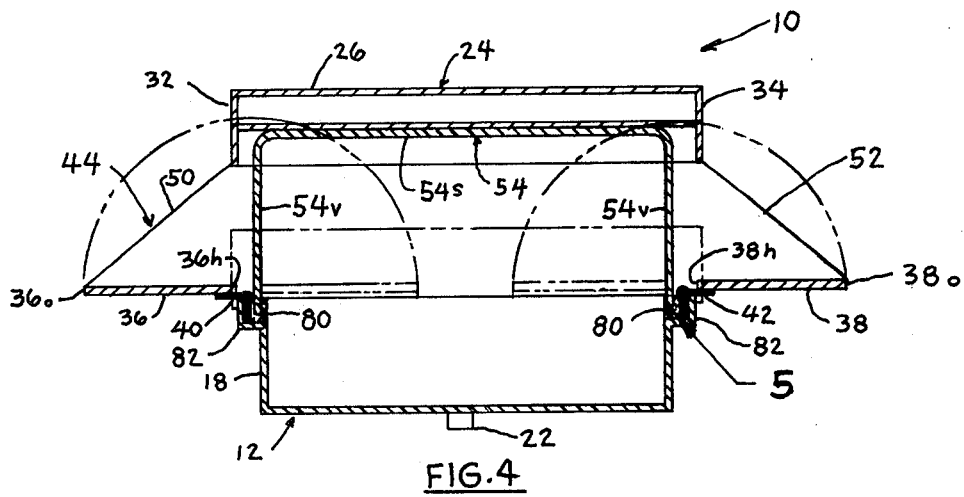
FIG. 4 is a sectional front view of the trailer taken along the line 4—4 in FIG. 2.

Within the trailer 10 are two flat rectangular floor defining members 36 and 38. The floor members are hinged along edges 36h and 38h to upper marginal edges of the sides 18 and 20 of the trailer bed 12. In this regard, conventional piano-type hinges 40 and 42 are secured to the edges 36h and 38h and to the sides 18 and 20 as shown most clearly in FIGS. 2 and 4. Thus supported, the floor members 36 and 38 are adapted to extend horizontally within the trailer bed 12 in the towing condition for the trailer shown in FIG. 1 and to swing upwardly and outwardly to horizontal positions beyond the sides 18 and 20 as shown in FIGS. 2 and 4. In these regards, FIGS. 2 and 4 illustrate the positions of the floor members when the trailer 10 is in a set-up condition forming a tent having the top member 24 acting as a solid top thereof.

To form the tent in the set-up condition for the trailer, the trailer 10 further includes tent material 44 secured along marginal edges of the top member 24 and along edges of the floor members other than the hinged edges 36h and 38h as illustrated in FIG. 2. In particular, the tent material includes trapezoidal front and back sections 46 and 48 secured along marginal edges of the front and back ends 28 and 30 of the top member 24, and front and rear edges of the floor members 36 and 38. The front and back sections may include zipper closable door and windows (not shown) as desired and are secured to rectangular right and left side sections 50 and 52 of the tent material 44. The side sections 50 and 52 are secured along marginal edges of the sides 32 and 34 of the top member 24 and along edges 36o and 38o of the floor members opposite the hinged edges 36h and 38h. Thus arranged, the tent material is designed to lay within the trailer between the floor members and the top member 24 when the trailer is in the towing condition and to automatically form right and left sides and front and back of the tent when the top member is raised and the floor members 36 and 38 are swung outwardly to define the set-up condition.

Preferably, the width of the side sections 50 and 52 of the tent material 44 is only slightly greater than the width of the floor members 36 and 38. This means that the tent material between the top member along the sides 32 and 34 and the edges 36o and 38o of the floor members is slightly longer than the radius of the arc of the floor members as they swing upwardly and then outwardly from the trailer bed 12 (see FIG. 4). Since the connections for the tent materials 50 and 52 to the marginal edges of the sides 32 and 34 of the top member 24 lie outside the inner sides of the trailer bed where the hinges 40 and 42 are connected (see FIG. 4). as the top member 24 is manually lifted from the trailer bed 12, the side sections 50 and 52 of the tent material exert lifting forces on the edges 36o and 38o of the floor members 36 and 38 along upward directions over centers defined by the hinges 40 and 42 so as to automatically lift and swing the floor members upwardly from the horizontal position within the trailer indicated in phantom outline in FIG. 4. During such operation, the top member is raised sufficiently high for the tent material and floor members to swing over the centers defined by the hinges and to lower outwardly to the horizontal position illustrated in solid outline in FIG. 4.

Figure 3:
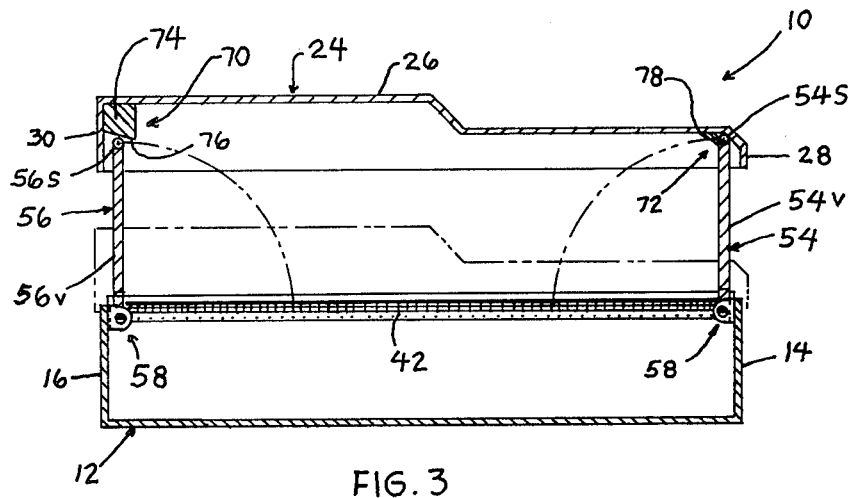
FIG. 3 is a sectional side view of the trailer taken along the line 3—3 of FIG. 2.
Figure 5:
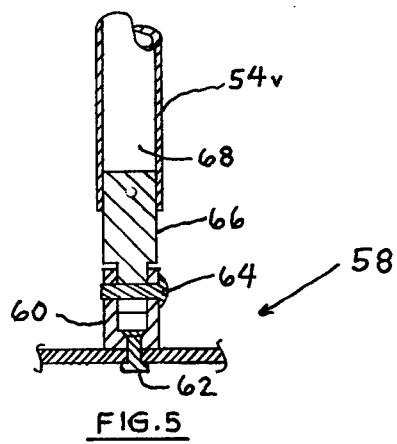
FIG. 5 is an enlarged sectional view of the hinge denoted by the arrow in FIG. 4.

To support the top member 24 and the tent material 44 in the set-up condition, the trailer 10 includes brace means at each corner of the trailer bed 12. Preferably such brace means comprises U-shaped brace members 54 and 56 having vertical arms 54v and 56v respectively and horizontal support arms 54s and 56s respectively. The end of each vertical arm of the brace members is hinged by means of a hinge 58 at a different corner of the trailer bed 12 to swing from a horizontal position within the trailer bed when the trailer is in the towing condition illustrated in FIG. 1, to a vertical support position when the trailer is in the set-up condition illustrated in FIGS. 2, 3, and 4. As shown in FIGS. 2 and 3, the hinges are secured to the ends 14 and 16 of the trailer bed 12 in the upper corner with the sides 18 and 20. Further, each hinge 58 includes a U-shaped bracket 60 secured as by a rivit 62 to the end of the trailer bed (see FIG. 5). A pivot pin 64 extends through the arms of the U-shaped bracket and through a connector plug 66 to secure the plug for swinging motion on the pivot pin between the arms. As shown in FIG. 5 the plug is pressure fit and pinned in the hollow end 68 of a vertical brace arm to complete the hinge connection provided by the hinge 58 as described above. Thus, it is a simple matter after raising the top member 24 and swinging the floor members 36 and 38 to their outward position, for one to reach into the trailer bed and swing the brace members 54 and 56 to vertical support positions to secure the tent in the set-up condition.

In the set-up condition, the support arm 54s and 56s engage the inside of the top member as most clearly shown in FIGS. 3 and 4. In such positions, the support arms engage detents 70 and 72 respectively. The detent 70 comprises a block secured to an underside of the top member at the back end 30 of the top member. The block 74 includes an inclined bottom for engaging the support arm 56s to releasably lock the arm and hence the brace member 56 in the vertical support position. Likewise, the detent 72 comprises a block secured to an underside of the top member along the front end thereof and the support arm 54s is adapted to snap between the block and the front end 28 of the top member and thus releasably lock in the vertical support position. In these regards, the brace members 54 and 56 are simply released from the detents by lifting up on the top member and manually swinging the brace members to their horizontal positions within the trailer bed. In such horizontal positions, the brace members rest on top of shoulders 80 defined be outwardly extending steps 82 along the upper marginal edges of each of the sides 18 and 20 of the trailer bed (see FIGS. 1 and 4). The shoulders 80 also may be used as support bases for pad members (not shown) which may be extended cross-wise within the bed 12 to complete a horizontal floor with the floor members 36 and 38 in the set-up condition for the trailer.

Also in the set-up condition for the trailer, additional support may be provided for the front of the trailer bed 12 and the floor members 36 and 38 as indicated in FIG. 2 by the ground engaging brace members 84 and 86. Such brace members may be releasably secured to the traler as illustrated after the trailer is placed in the set-up condition and act to further stabilize the trailer particularly when being used as a tent.

I claim:

1. A lightweight and compact tent-type trailer which is easy to set up and collapse and which is especially adapted for towing by motorcycles and the like, comprising:
   a trailer bed having upstanding sides and ends and defining a base for a tent when the trailer is in a set-up condition;
   first and second hinge means at and along upper marginal edges of opposite ones of said upstanding sides of said trailer bed;
   first and second flat floor defining members for said tent connected along one edge thereof to said first and second hinge means respectively to extend in horizontal directions from said bed in said set-up condition;
   a top member for covering said trailer bed when the trailer is in a towing condition and for forming a top for said tent when said trailer is in its set-up condition, said top member having marginal edges extending along and outside respective ones of said first and second hinge means connected to said sides of said trailer bed;
   tent material secured along said marginal edges of said top member and along an edge of each of said floor defining members opposite the one hinged edge thereof to lay within said trailer and between waid floor defining members and said top member when said trailer is in said towing condition and to form right and left sides, front and back of said tent when said top member is raised and said floor defining members swing outwardly to define said set-up condition, said tent material having a width between said edge of said floor defining members and marginal edge of said top member which is slightly greater than that of said floor member to which it is connected whereby said tent material exerts lifting forces on said floor defining members as said top member is raised to automatically swing said floor defining members upwardly over centers defined by said first and second hinge means as said top member is raised sufficiently high to allow said tent material and floor members to clear said top member and then outwardly from said trailer bed to said set-up condition; and
   brace members at each corner of said trailer bed for supporting said top member in said set-up condition.

2. The trailer of claim 1 including third hinge means connected to each brace member and to an upstanding end of said trailer bed to support said brace members for manual swinging motion from generally horizontal positions within said trailer bed in said towing condition to generally vertical support positions in said set-up condition, and detent means on said top member for engaging and releasably locking said brace members in said vertical support positions.

3. The trailer of claim 2 wherein said brace members are U-shaped members secured at ends thereof to said hinge means and including a cross support member for engaging said detent means.

4. The trailer of claim 3 wherein said trailer bed includes an outwardly extending step in its sides adjacent the upper marginal edges thereof defining a base for supporting said U-shaped brace members in said towing condition with said floor defining members on top thereof under said top member.

* * * * *